3,331,679
METHOD FOR REDUCING IRON ORE
Hermann Schenck, and Werner Wenzel, Aachen, Germany, assignors to Rheinstahl Industrie-Planung G.m.b.H., Essen, Germany
Filed June 29, 1964, Ser. No. 378,512
Claims priority, application Germany, June 28, 1963, R 35,532
7 Claims. (Cl. 75—34)

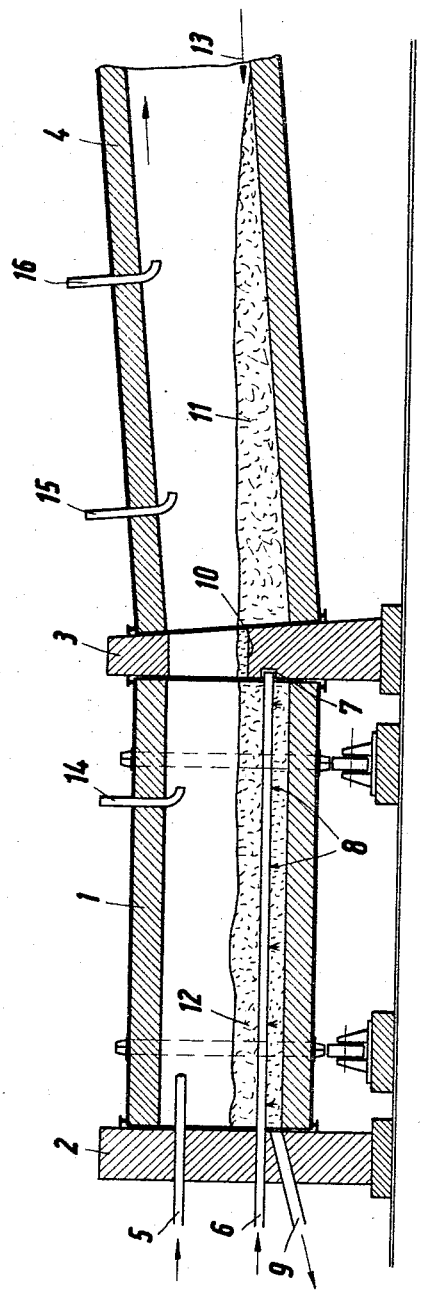

The present invention relates to a method and apparatus for reducing iron ore and, more particularly, the present invention is concerned with reducing iron ore in a revolving cylindrical furnace arrangement.

Several methods for the reduction of iron ores in revolving cylindrical furnaces have been proposed. According to some of these methods, solid carbon is added to the ore as reducing agent. According to other methods, fluid hydrocarbons contact the already partially reduced hot air in the region of the end portion of the revolving cylindrical furnace which carries the heating device, while the preferably finely subdivided iron ore is introduced into the revolving furnace at its opposite cold end portion and passes, due to the rotation of the cylindrical furnace, about a somewhat inclined axis, in countercurrent to the heating gas towards the other end portion of the furnace which carries the heating device. The temperature of the ore in the region of the furnace in which the ore is contacted by the hydrocarbons is between about 800 and 1100° C. This temperature range is required in order to stay below the sintering temperature of the slightly or already considerably reduced particulate ore. The hydrocarbons are substantially completely cracked by contact with the ore at this temperature range. This cracking can be carried out under simultaneous binding of the oxygen of the ore or by reaction with simultaneously introduced oxygen containing gases so that a mixture of reducing gases consisting essentially of carbon monoxide and hydrogen is formed. However, the cracking of the hydrocarbons may also be carried out in such a manner that finely subdivided carbon particles are formed as one of the products of the cracking process, which finely subdivided carbon particles serve as a reducing agent for the ore.

It is an object of the present invention to provide a method and apparatus for reducing iron ore, utilizing cracked hydrocarbons, which can be carried out in a particularly effective and economic manner.

It is a further object of the present invention to provide a process and device for reducing iron ore in a revolving cylindrical furnace under utilization of cracked hydrocarbons whereby agglomeration of the ore during the process is prevented.

It is yet a further object of the present invention to provide a method and device for the reducing of iron ore with cracked hydrocarbons in a revolving cylindrical furnace arrangement whereby carbon is produced by cracking of the hydrocarbons and this carbon is partially used for preventing agglomeration of the iron ore and is fully utilized by being recycled as will be described in detail further below.

Other objects and advantages of the present invention will become apparent from a further reading of the description and of the appended claims.

With the above and other objects in view, the present invention contemplates a method of reducing iron ore in a revolving cylindrical furnace, comprising the steps of introducing into one end portion of a revolving cylindrical furnace a mixture of subdivided reducible iron ore and finely subdivided carbon obtained by cracking of hydrocarbons so as to form in said furnace a tumbling bed consisting of the mixture, transporting the tumbling bed from the one end portion of the furnace toward the other end portion thereof, introducing into the furnace in the region of the other end portion thereof combustion air and an amunt of hydrocarbons in excess of the amount thereof which can be burned by the combustion air so as to burn only a portion of the hydrocarbons and to crack the residual portion of the hydrocarbons under formation of reducing gases and of finely subdivided carbon, the reducing gases and a portion of the thus formed finely subdivided carbon flowing towards the one end portion of the furnace and the residual portion of the thus formed finely subdivided carbon being incorporated in the tumbling bed of the mixture passing towards the other end portion of the furnace, the reducing gases and carbon causing reduction of the ore of the mixture, the amount of hydrocarbons and of combustion air being introduced into the furnace being so chosen that the amount of finely subdivided carbon in the bed will be greater than the amount thereof which is capable of reacting with the ore under reduction of the latter so that a residual amount of finely subdivided carbon will remain in the bed and will prevent agglomeration of the ore particles thereof, and withdrawing the thus formed mixture of reduced ore and finely subdivided carbon from the furnace in the region of the other end portion thereof.

The present invention is also concerned with a revolving cylindrical furnace arrangement adapted for the reduction of iron ore, comprising, in combination, first revolving cylindrical furnace means having opposite inlet and outlet portions, second revolving cylindrical furnace means having opposite inlet and outlet portions, the outlet portion of the first furnace means being adjacent to and communicating with the inlet portion of the second furnace means, means for introducing iron ore into the inlet portion of the first furnace means, means for rotating said first and second furnace means for forming therein a tumbling bed or iron ore passing from the inlet portion of the first furnace means toward said outlet portion of the second furnace means, means for introducing fluid hydrocarbons and combustion air into the region of the outlet portion of the second furnace means for partially burning and partially cracking the hydrocarbons under formation of hot reducing gases and carbon particles, the latter forming a mixture with the iron ore, the hot reducing gases flowing in countercurrent to the tumbling bed towards the inlet portion of the first furnace means thereby reducing the iron ore, and withdrawal means for withdrawing a mixture of at least partially reduced iron ore and carbon particles from the outlet portion of the second furnace means.

Thus, the method of the present invention proposes to reduce iron ores in a revolving cylindrical furnace by means of fluid, liquid or gaseous hydrocarbons, according to which at the outlet end portion of the furnace the hydrocarbons are brought in contact with hot already substantially reduced iron ore and are cracked under precipitation of carbon particles while simultaneously a limited amount of combustion air, preferably in preheated condition, is blown into the same region, i.e. into the region of the outlet end portion of the revolving cylindrical furnace.

The method of the present invention requires that the reaction of the fluid hydrocarbons which are blown into the revolving cylindrical furnace, and particularly the cracking of the hydrocarbons, is carried out in a manner which will provide an excess of carbon particles over the amount thereof which will take part in the reducing of the iron ore.

The excess of carbon particles produced by cracking and not reacted with the iron ore will be withdrawn from the revolving cylindrical furnace, partly together with the reduced iron ore thereby at least substantially preventing agglomeration of the reduced ore, and partly the carbon particles will be carried by the reducing gases through the revolving cylindrical furnace, in countercurrent flow to the ore and will be withdrawn from the furnace at the ore inlet portion thereof. The carbon particles which accompany the reduced ore, as well as the carbon particles which are withdrawn with the more or less spent reducing gases are then recovered and are admixed to subsequent portions of the particulate iron ore which is charged into the revolving cylindrical furnace.

The cracked finely particulate carbon or soot which is formed by cracking of the hydrocarbons is thus partly carried along with the gases which leave the furnace at its cold ore inlet portion and is partly mixed with the tumbling solid charge of the furnace. To the extent to which the thus formed carbon particles are not consumed either when reducing the charge or by combustion, the carbon particles are recovered from the waste gases by dust collecting methods known per se, and from the reduced charge by separation in conventional manner, for instance by magnetic separation.

As pointed out above, the cracking of the hydrocarbons is so controlled according to the present invention that an excess of solid carbon beyond that which will be burned or react with the ore is formed. The thus formed and recovered excess is then admixed to the new charge which is to be introduced into the revolving cylindrical furnace. This process can be easily carried out in a continuous manner.

It is the purpose of the carbon which is thus admixed to the iron ore prior to the introduction into the revolving cylindrical furnace to prevent agglomeration or baking together of the finely subdivided ore once the same has reached a temperature of between about 700 and 850° C., and the amount of excess solid carbon which is to be produced in the present process will be so chosen as to be sufficient for serving this purpose.

In addition, the finely subdivided particles produced by the cracking of the hydrocarbons also serve as a reducing agent and, starting with a temperature of about 600° C. and an intensity which will increase with increasing temperatures, the carbon will serve to bind, i.e. to react with the oxygen of the ore.

Thus, the entire reduction of the ore is achieved according to the present invention partly by utilizing a portion of the carbon particles as a reducing agent and partly by utilizing the reducing gases formed upon cracking and decomposition of the hydrocarbons.

It is a very essential advantage of the present invention that the excess portion of the solid carbon which does not precipitate in the chemical, i.e. reducing, reactions and which will prevent the sintering or agglomeration of the ore, will not be lost but will be recycled, whereby the process can be carried out in a particularly economical manner.

The process of the present invention may be carried out in various ways.

Preferably, the hydrocarbons are blown into the bed formed of the charge which is introduced into the furnace, by means of one or more stationary lances which are preferably so located that they will be covered at all sides by the charge, or at least so that the nozzles of the lances will be closely adjacent to the surface of the charge. Advantageously, the lances are fixed to the stationary furnace port and do not rotate with the cylindrical furnace. However, it is also possible to blow the hydrocarbons into the bed formed by the charge by providing in the furnace mantle, in a manner known per se, openings which serve as injection nozzles whih revolve together with the furnace and through which hydrocarbons are blown into the charge whenever the respective nozzle is located below the surface of the bed formed by the charge. Thereby, the intensity of the introduction of fluid hydrocarbons into the charge may be so controlled that the amount of hydrocarbons which is introduced will increase and decrease with the distance of the respective nozzle from the surface of the bed formed by the charge. In other words, a greater amount of hydrocarbons per unit of time will be introduced while the nozzle is further distant (below) the surface of the bed and the rate of introduction of hydrocarbons will decrease as the distance between the nozzle and the surface of the bed becomes smaller.

It is particularly advantageous according to the present invention to blow primary air into the furnace jointly with the fluid hydrocarbons, for instance by means of an annular nozzle. Thereby, the amount of primary air relative to the amount of hydrocarbons which is introduced into the furnace is preferably so adjusted that the oxygen content of the primary air is equal to between 5 and 25% of the amount required for complete combustion of the hydrocarbons or of the cracking products formed therefrom. In other words, the amount of hydrocarbons which is introduced will be equal to between about 4 and 20 times the stoichiometric amount of combustion air available for burning of the hydrocarbons. Thus, the major portion of the hydrocarbons will be cracked and the thus obtained cracking products will serve as reducing agents and partly, in the form of carbon particles as separating agents for the ore particles, while the minor portion of the hydrocarbons which is burned will supply heat.

Additional combustion air (secondary air) is introduced through a burner arranged above the charge, and through several burners which are located on and penetrate through the revolving mantle of the furnace. By this arrangement, it is possible to control the amount of carbon particles which will not participate in the reduction reaction so that excess combustion of carbon particles in the gas space of the furnace is prevented and at the same time an advantageous temperature curve will be established throughout the length of the furnace such that, for instance at the ore inlet end portion of the revolving cylindrical furnace, the temperature may be about 30° C. and at the hot outlet end portion for the reduced iron ore about 1000° C.

The primary air which is blown into the bed formed by the charge together with the hydrocarbons will be controlled with respect to its amount and adjusted to the amount or rate of introduction of hydrocarbons, whereby it is advantageous to blow at least part of the air continuously into the furnace, even in arrangements wherein the introduction of hydrocarbons is interrupted when the respective nozzle rises above the level of the charge.

In this manner, it is possible to produce an amount of excess carbon which leaves the furnace together with the reduced air and in part with the waste gases which equals between 10 and 25% and preferable about 20% of the amount of ore which is simultaneously introduced into the furnace.

In order to avoid that the finely subdivided particles which will be located in the gas space of the furnace are subjected to combustion by the secondary air which is blown into the gas space of the furnace, it has been found advantageous and is within the scope of the present invention to subject the secondary air completely or partially to combustion with an auxiliary fuel prior to introduction of the secondary air into the gas space of the furnace. The combustible waste gases leaving the furnace are advantageously used as such auxiliary fuel. This precombustion of the secondary air can be carried out by introducing the auxiliary fuel together with air into the furnace through burners which will form a very short flame. However, it is also possible to arrange a combustion space outside of the revolving furnace and to burn therein the auxiliary fuel with the secondary air so that then only the hot combustion gases are blown into the revolving furnace.

While it will generally suffice to admix to the iron ore which is to be introduced into the furnace between about 10 and 25% of its weight of carbon particles, it is also within the scope of the present invention to admix to ores which tend very strongly to agglomerate or to bake together larger proportions of carbon particles, for instance so that a mixture containing 50% carbon particles and 50% ore is introduced into the furnace. By proceeding in this manner, baking together can be practically completely avoided at temperatures of up to about 1100° C. By proceeding in this manner, i.e. by introducing larger proportions of carbon together with the ore into the furnace, the mixture of reduced ore and carbon which leaves the furnace will also contain a larger proportion of carbon particles, for instance 25%. As has been described further above, the carbon leaving the furnace together with the reduced ore is separated from the latter by magnetic separation and admixed to ore portions which are subsequently introduced into the furnace.

Because of the different conditions which prevail in the various portions of the reduction process, it has been found advisable to utilize for carrying out the present invention one or more coacting revolving cylindrical furnaces, each of which or each part of a single furnace are specifically adjusted for the part of the process which is to be carried out therein.

Thus, for instance, two revolving cylindrical furnaces may be used which are arranged in series, so that the ore and carbon mixture will first pass through one of the two furnaces which will serve primarily for heating the mixture, and then through the second furnace which serves primarily for the cracking of the hydrocarbons and for the reduction of the iron ore. Thereby, the heating gases will pass first in countercurrent to the charge through the second furnace in which a higher temperature will be maintained and thereafter through the first furnace which is cooler and serves for preheating the charge.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the drawing is a schematic elevational view partially in cross section of a revolving cylindrical furnace arrangement according to the present invention.

Referring now to the drawing, reference numeral 1 denotes a revolving cylindrical furnace which rotates about a horizontal axis and serves for cracking the hydrocarbons and for carrying out the major portion of the reduction of the iron ore. Furnace ports 2 and 3 are stationary and a conventional seal is formed between the rotating furnace mantle 1 and the stationary furnace ports 2 and 3.

Reference numeral 4 denotes a second revolving cylindrical furnace which rotates about an axis which is somewhat inclined to the horizontal. It will be immediately apparent that due to the inclination of furnace 4, upon rotation of furnaces 1 and 4, the charge will not only be tumbled but also transported in the direction from furnace 4 towards furnace 1.

Furnace 4 serves for preheating the charge and also for partially reducing the same.

Secondary air is introduced through a lance or other suitable device 5 which penetrates through furnace port 2. Primary air and fluid hydrocarbons, for instance oil, are introduced through a tubular member or lance 6 which is located in furnace 1 below the level of charge 12 therein. As illustrated, lance 6 penetrates through furnace port 2 and is supported in a bearing 7 fixed to furnace port 3. Lance 6 is formed with a plurality of downwardly directed openings or nozzles 8 through which the mixture of hydrocarbons and primary air is blown into the charge. Primary air is blown into the oil conduit leading to lance 6 (not shown) so that through lance 6 a mixture of oil and, for instance, 15% primary air are introduced into the charge.

Furnace port 2 furthermore accommodates an outlet conduit 9 through which continuously a mixture of finely particulate reduced ore and carbon are withdrawn.

The initial charge consisting, for instance, of 80% ore and 20% finely particulate carbon produced by cracking hydrocarbons in furnace 1 as described above, and indicated by reference numeral 11, is introduced at the cold inlet end 13 of inclined revolving cylindrical furnace 4 and leaves cylindrical furnace 4 at its outlet portion 10, passing through an opening in furnace port 3 into horizontal revolving cylindrical furnace 1.

Burners 14, 15 and 16 are arranged at the circumference of rotating furnaces 1 and 4. The waste gas consisting of the burned waste gases of the reduction process and of the cracked reducing gases which are partially burned with the combustion air introduced through burners 5, 14, 15 and 16 leaves the furnace arrangement at the cold inlet end portion 13 of furnace 4.

According to another embodiment of the present invention, it is also possible to pass the mixture of at least substantially reduced iron ore and carbon which leaves furnace 1 through outlet 9, through a further revolving cylindrical furnace in which the thus formed charge is further heated.

The following examples are given as illustrative only, the invention, however, not being limited to the specific details of the examples.

Example 1

In an inclined rotary kiln an iron ore of the analysis

| | Percent |
|---|---|
| Fe (as $Fe_2O_3$) | 61.5 |
| Fe (as FeO) | 1.8 |
| $SiO_2$ | 2.3 |
| $Al_2O_3$ | 0.9 |
| CaO+MgO | 0.3 |
| Remainder volatile matter. | |

94.5% having grain size of less than 0.5 mm. and 3.5% of more than 0.5 mm. was treated according to this invention with an oil of the following ultimate analysis

| | Percent |
|---|---|
| C | 85.3 |
| H | 11.0 |
| S | 2.5 |
| $N_2+O_2$ | 1.0 |

The time of traveling through the kiln was 6 hours. The reduction ratio in the treated ore was 87%. Per 1 ton of ore 970 kg. oil were used.

The oil was injected into a 60 cm. high layer of the ore by water cooled nozzles, together with 8% of the quantity of air required for complete combustion of said oil. At the discharge end of the kiln the reduction temperature was at 1060° C.

The gas coming out of the ore layer into the free furnace chamber contained 17% of finely subdivided carbon and the reduced ore contained 8% of finely subdivided carbon.

Example 2

The procedure and the materials used were the same as in Example 1 except that 25% by weight of finely subdivided carbon produced by cracking of oil, the percentage figure being based on the ore to be treated, were added to the ore and that the quantity of the oil was but 820 kg. per metric ton of ore treated. The temperature at the discharge end of the kiln was raised to 1110° C. and the time of travelling through the kiln was shortened to 5¼ hours. From the waste gas of the kiln 17% and from the reduced ore 8% by weight of carbon were recovered and continuously added to the ore to be charged at the charging end of the kiln.

Example 3

The procedure and the materials used were the same as in Example 2, but in this case the quantity of the oil was reduced to 790 kg. per metric ton of iron ore to be reduced, and additionally, secondary air was blown into the kiln above the bed of the materials treated, which secondary air had been burnt previously by a gas with a calorific value of 1800 kcal. per normal cu./meter of air, 80% of the oxygen contained in said air being chemically bound by this pre-combustion.

Exampel 4

Example 3 was repeated except that waste gas of the kiln containing

| | Percent by volume |
|---|---|
| $H_2$ | 28 |
| CO | 8 |
| $CH_4$ | 3.5 |
| $C_nH_m$ | .8 |

Remainder $N_2$, $CO_2$ and $H_2O$.

was used to preburn 80% of the secondary air.

Example 5

In said inclined kiln an iron ore, magnetite, of the analysis

| | Percent by weight |
|---|---|
| Fe | 65 |
| $SiO_2$ | 1.8 |
| $Al_2O_3$ | .4 |
| CaO+MgO | 1.1 |

98% by weight having grain size of less than 1 millimeter and 40% of less than .06 mm. was treated according to this invention with oil of the same ultimate analysis as in Example 1.

The time of travelling through the kiln was 5¾ hours. The reduction ratio in the treated ore was 84%. Per 1 ton of ore 910 kg. oil were used.

The oil was injected into a 60 cm. high layer of the ore by water cooled nozzles, together with primary air in an amount of 8% of the quantity of air required for complete combustion of said oil said air was preheated to 400° C. 20% of the finely subdivided carbon produced by cracking of the oil based on the charging mixture were gained from the furnace, 9% thereof out of the waste gas and 11% out of the reduced ore.

It will be understood that each of the elements described above, or two or more together, may also find a useful application in other types of furnace arrangements differing from the types described above.

While the invention has been illustrated and described as embodied in a furnace arrangement comprising a plurality of coacting revolving cylindrical furnaces, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of reducing iron ore in a revolving cylindrical furnace, comprising the steps of introducing into one end portion of a revolving cylindrical furnace a mixture of subdivided reducible iron ore and finely subdivided carbon obtained by cracking of hydrocarbons so as to form in said furnace a tumbling bed consisting of said mixture; transporting said tumbling bed from said one end portion of said furance toward the other end portion thereof; jointly introducing into said tumbling bed in said furnace in the region of the other end portion thereof primary combustion air and an amount of hydrocarbons equal to between 4 and 20 times the amount thereof which can be burned by said primary combustion air so as to burn only a portion of said hydrocarbons and to crack the residual portion of said hydrocarbons under formation of reducing gases and of finely subdivided carbon, said reducing gases and a portion of the thus formed finely subdivided carbon flowing towards said one end portion of said furnace and the residual portion of the thus formed finely subdivided carbon being incorporated in said tumbling bed of said mixture passing towards the other end portion of said furnace, said reducing gases and carbon causing reduction of the ore of said mixture; introducing secondary combustion air into said furnace at a point spaced from said end portions thereof, the amount of hydrocarbons and of primary combustion air being introduced into said furnace being so chosen that the amount of finely subdivided carbon in said bed will be greater than the amount thereof which is capable of reacting with said ore under reduction of the latter so that a residual amount of finely subdivided carbon will remain in said bed and will prevent agglomeration of the ore particles thereof; and withdrawing the thus formed mixture of reduced ore and finely subdivided carbon from said furnace in the region of said other end portion thereof.

2. A method of reducing iron ore in a revolving cylindrical furnace, comprising the steps of introducing into one end portion of a revolving cylindrical furnace a mixture of subdivided reducible iron ore and finely subdivided carbon obtained by cracking of hydrocarbons so as to form in said furnace a tumbling bed consisting of said mixture; transporting said tumbling bed from said one end portion of said furnace toward the other end portion thereof; jointly introducing into said tumbling bed in said furnace in the region of the other end portion thereof primary combustion air and an amount of hydrocarbons equal to between 4 and 20 times the amount thereof which can be burned by said primary combustion air so as to burn only a portion of said hydrocarbons and to crack the residual portion of said hydrocarbons under formation of reducing gases and of finely subdivided carbon, said reducing gases and a portion of the thus formed finely subdivided carbon flowing towards said one end portion of said furnace and the residual portion of the thus formed finely subdivided carbon being incorporated in said tumbling bed of said mixture passing towards the other end portion of said furnace, said reducing gases and carbon causing reduction of the ore of said mixture; introducing into said furnace at a point spaced from said end portion thereof secondary air, which secondary air prior to such introduction has been subjected to at least partial combustion with an auxiliary fuel, the amount of hydrocarbons and of primary combustion air being introduced into said furnace being so chosen that the amount of finely subdivided carbon in said bed will be greater than the amount thereof which is capable of reacting with said ore under reduction of the latter so that a residual amount of finely subdivided carbon will remain in said bed and will prevent agglomeration of the ore particles thereof; withdrawing the thus formed mixture of reduced ore and finely subdivided carbon from said furnace in the region of said other end portion thereof; withdrawing said subdivided carbon-containing gases from said furnace in the region of said one end portion thereof; and recovering finely subdivided carbon from said withdrawn mixture and said withdrawn gases for mixing with subsequent portions of subdivided reducible iron ore and introduction of the thus formed mixture into said one end portion of said revolving cylindrical furnace.

3. A method of reducing iron ore in a revolving cylindrical furnace, comprising the steps of introducing into one end portion of a revolving cylindrical furnace a mixture of subdivided reducible iron ore and finely subdivided carbon obtained by cracking of hydrocarbons so as to form in said furnace a tumbling bed consisting of said mixture; transporting said tumbling bed from said one end portion of said furnace toward the other end portion thereof; jointly introducing into said tumbling bed in said furnace in the region of the other end portion thereof primary combustion air and an amount of hydrocarbon equals between 4 and 20 times the amount thereof which can be burned by said primary combustion air so as to burn only a portion of said hydrocarbons and to crack the residual portion of said hydrocarbons under formation of reducing gases and of finely subdivided carbon, said reducing gases and a portion of the thus formed finely subdivided carbon flowing towards said one end portion of said furance and the residual portion of the thus formed finely subdivided carbon being incorporated in said tumbling bed of said mixture passing towards the other end portion of said furnace, said reducing gases and carbon causing reduction of the ore of said mixture, intoducing into said furnace at a point spaced from said end portions thereof secondary air which prior to such introduction has been subjected to substantially complete combustion with an auxiliary fuel, the amount of hydrocarbons and of primary combustion air being introduced into said furnace being so chosen that the amount of finely subdivided carbon in said bed will be greater than the amount thereof which is capable of reacting with said ore under reduction of the latter so that a residual amount of finely subdivided carbon will remain in said bed and will prevent agglomeration of the ore particles thereof; withdrawing the thus formed mixture of reduced ore and finely subdivided carbon from said furnace in the region of said other end portion thereof; withdrawing said subdivided carbon-containing gases from said furnace in the region of said one end portion thereof; recovering finely subdivided carbon from said withdrawn mixture and said withdrawn gases; mixing the thus recovered finely subdivided carbon with subsequent portions of subdivided reducible iron ore; and introducing the thus formed mixture into said one end portion of said revolving cylindrical furnace.

4. A method of reducing iron ore in a revolving cylindrical furnace, comprising the steps of introducing into one end portion of a revolving cylindrical furnace a mixture of subdivided reducible iron ore and finely subdivided carbon obtained by cracking of hydrocarbons so as to form in said furnace a tumbling bed consisting of said mixture; transporting said tumbling bed from said one end portion of said furnace toward the other end portion thereof; jointly introducing into said tumbling bed in said furnace in the region of the other end portion therof primary combustion air and into the interior of said revolving bed an amount of hydrocarbons equal to between 4 and 20 times the amount thereof which can be burned by said primary combustion air so as to burn only a portion of said hydrocarbons and to crack the residual portion of said hydrocarbons under formation of reducing gases and of finely subdivided carbon, said reducing gases and a portion of the thus formed finely subdivided carbon flowing towards said one end portion of said furnace and the residual portion of the thus formed finely subdivided carbon being incorporated in said tumbling bed of said mixture passing towards the other end portion of said furnace, said reducing gases and carbon causing reduction of the ore of said mixture, introducing into said furnace at a point spaced from said end portions thereof secondary air which prior to such introduction has been subjected to substantially complete combustion with an auxiliary fuel, the amount of hydrocarbons and of primary combustion air being introduced into said furnace being so chosen that the amount of finely subdivided carbon in said bed will be greater than the amount thereof which is capable of reacting with said ore under reduction of the latter so that a residual amount of finely subdivided carbon will remain in said bed and will prevent agglomeration of the ore particles thereof; and withdrawing the thus formed mixture of reduced ore and finely subdivided carbon from said furnace in the region of said other end portion thereof.

5. A method of reducing iron ore in a revolving cylindrical furnace, comprising the steps of introducing into one end portion of a revolving cylindrical furnace a mixture of subdivided reducible iron ore and finely subdivided carbon obtained by cracking of hydrocarbons so as to form in said furnace a tumbling bed consisting of said mixture; transporting said tumbling bed from said one end portion of said furnace toward the other end portion thereof; jointly introducing into said tumbling bed in said furnace in the region of the other end portion thereof primary combustion air and an amount of hydrocarbons equal to between about 4 and 20 times the amount thereof which can be burned by said primary combustion air so as to burn only a portion of said hydrocarbons and to crack the residual portion of said hydrocarbons under formation of reducing gases and of finely subdivided carbon, said reducing gases and a portion of the thus formed finely subdivided carbon flowing towards said one end portion of said furance and the residual portion of the thus formed finely subdivided carbon being incorporated in said tumbling bed of said mixture passing towards the other end portion of said furnace, said reducing gases and carbon causing reduction of the ore of said mixture, the amount of hydrocarbons and of combustion air being introduced into said furnace being so chosen that the amount of finely subdivided carbon in said bed will be greater than the amount thereof which is capable of reacting with said ore under reduction of the latter so that a residual amount of finely subdivided carbon will remain in said bed and will prevent agglomeration of the ore particles thereof; and withdrawing the thus formed mixture of reduced ore and finely subdivided carbon from said furnace in the region of said other end portion thereof.

6. A method according to claim 2 wherein said secondary air is pre-burned with at least a portion of said withdrawn gases after recovery of subdivided carbon therefrom.

7. A method of reducing iron ore in a revolving cylindrical furnace, comprising the steps of introducing into one end portion of a revolving cylindrical furnace a mixture of subdivided reducible iron ore and finely subdivided carbon obtained by cracking of hydrocarbons so as to form in said furnace a tumbling bed consisting of said mixture; transporting said tumbling bed from said one end portion of said furnace toward the other end portion thereof; jointly introducing into said tumbling bed in said furnace in the region of the other end portion thereof hot, partially pre-burned secondary combustion air and into the interior of said revolving bed primary combustion air together with an amount of hydrocarbons equal to between about 4 and 20 times of the amount thereof which can be burned by said primary combustion air so as to burn only a portion of said hydrocarbons and to crack the residual portion of said hydrocarbons under formation of reducing gases and of finely subdivided carbon, said reducing gases and a portion of the thus formed finely subdivided carbon flowing towards said one end portion of said furnace and the residual portion of the thus formed finely subdivided carbon being incorporated in said tumbling bed of said mixture passing towards the other end portion of said furnace, said reducing gases and carbon causing reduction of the ore of said mixture, the amount of hydrocarbons and of primary combustion air being introduced into said furnace being so chosen that the amount of finely subdivided carbon in said bed will be greater than the amount thereof which is capable of reacting with said ore under reduction of the latter so that a residual amount of finely subdivided carbon will remain in said bed and will prevent agglomeration of the ore particles thereof; withdrawing the thus formed mixture of reduced ore and finely subdivided carbon from said furnace in the region of said other end portion thereof; withdrawing said subdivided carbon-containing gases from said furnace in the region of said one end portion thereof; and recovering finely subdivided carbon from said withdrawn mixture and said withdrawn gases; mixing the thus recovered finely subdivided carbon with subsequent portions of subdivided reducible iron ore; and introducing the thus formed mixture into said one end portion of said revolving cylindrical furnace.

References Cited

UNITED STATES PATENTS

| | | | |
|---|---|---|---|
| 889,125 | 5/1908 | Hartenstein | 75—36 X |
| 1,829,438 | 10/1931 | Coley | 75—36 X |
| 2,417,949 | 3/1947 | Riveroll | 75—34 |
| 3,046,106 | 7/1962 | Hemminger et al. | 75—36 |
| 3,180,725 | 4/1965 | Meyer et al. | 75—34 X |
| 3,182,980 | 5/1965 | Helfrich | 75—34 X |
| 3,231,366 | 1/1966 | Schenck et al. | 75—90 X |
| 3,305,345 | 2/1967 | Rausch et al. | 75—33 X |

HYLAND BIZOT, *Primary Examiner.*

DAVID L. RECK, *Examiner.*

H. W. TARRING, *Assistant Examiner.*